Feb. 12, 1929.
R. E. C. YOCKERS
1,702,146
SORGHUM THRASHING MACHINE
Filed Dec. 30, 1925     4 Sheets-Sheet 1
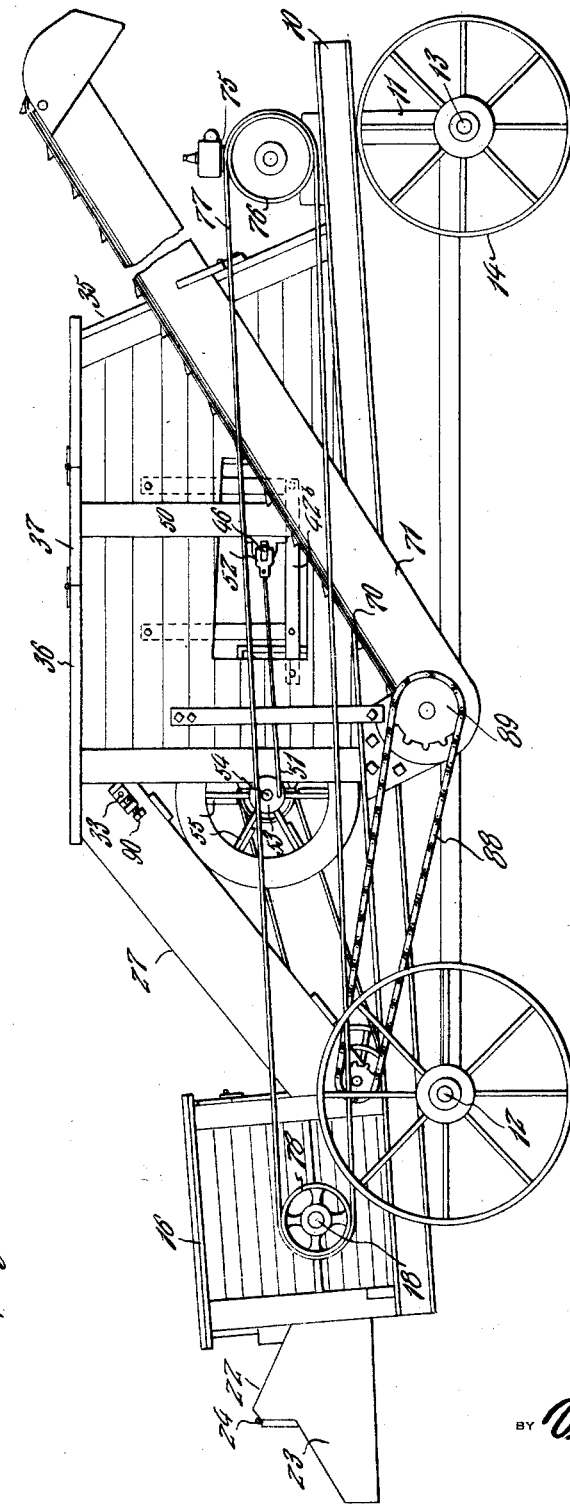
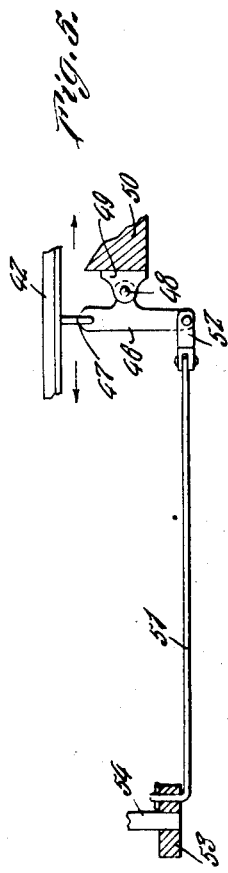
R. E. C. Yockers
INVENTOR
BY Victor J. Evans
ATTORNEY

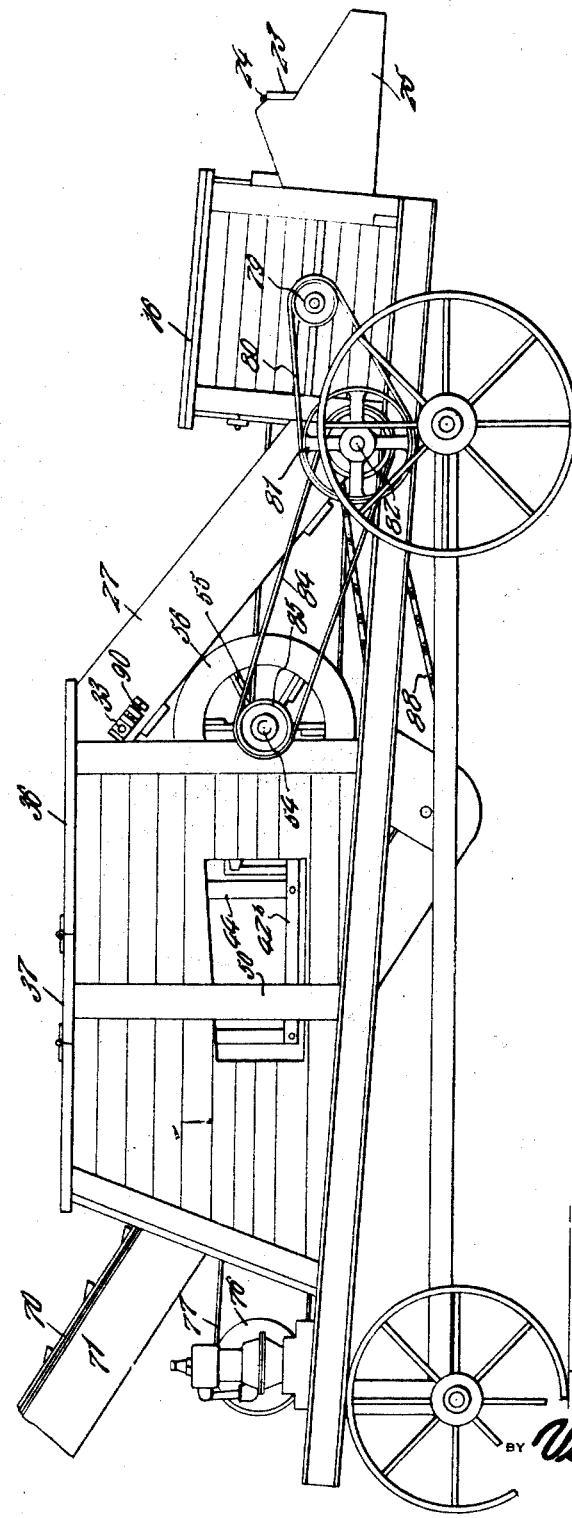

Feb. 12, 1929.
R. E. C. YOCKERS
1,702,146
SORGHUM THRASHING MACHINE
Filed Dec. 30, 1925   4 Sheets-Sheet 3
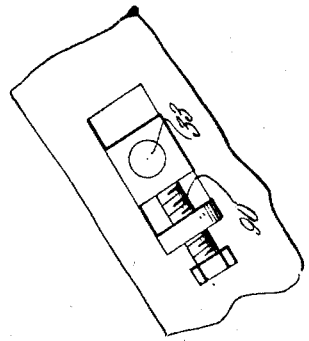
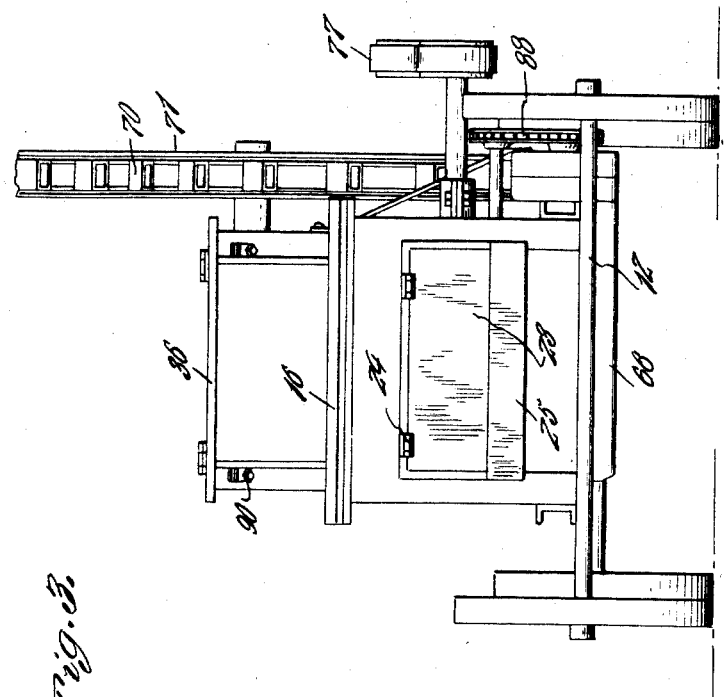
R.E.C.Yockers
INVENTOR
BY Victor J. Evans
ATTORNEY

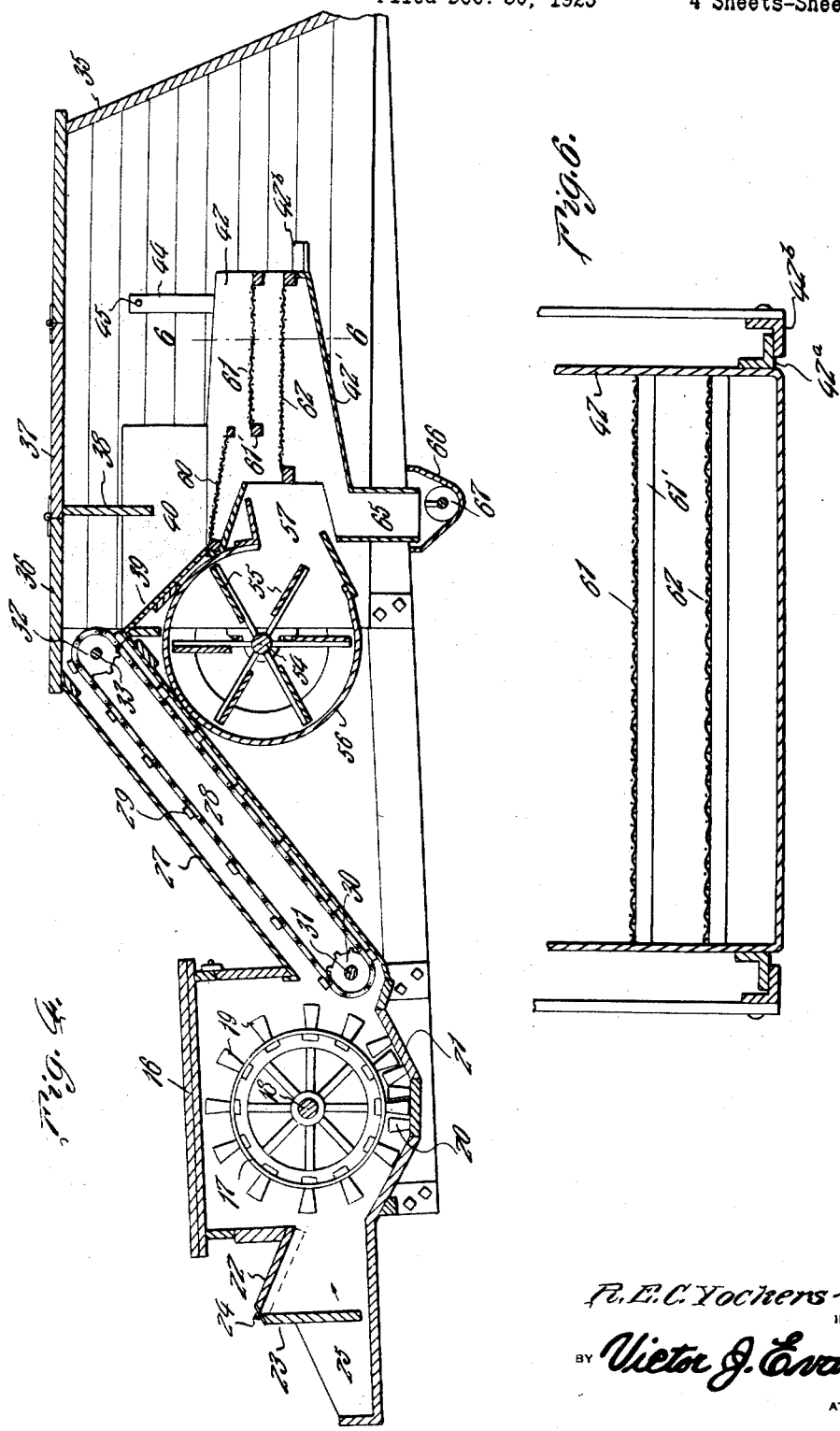

Patented Feb. 12, 1929.

1,702,146

UNITED STATES PATENT OFFICE.

RALPH E. C. YOCKERS, OF SMOLAN, KANSAS.

SORGHUM-THRASHING MACHINE.

Application filed December 30, 1925. Serial No. 78,429.

The object of this invention is to provide a machine adapted to thrash cane, Kafir corn, Siberian wheat, Sudan grass seed and the like, and to accomplish this result without topping the material and without cracking the grain or seed.

A further object is to provide a machine which shall include a cleaning cylinder mounted in a housing in which the bunches are held while the seed is being knocked off, and an elevating conveyor extending from the housing to a fan housing in which the material passes over vibrating screens, the waste being blown off by a fan and falling through the open bottom of the fan housing and the thrashing grain or seed passing from the screens through a chute and thence to a conveyor by means of which it is loaded into a wagon.

With the foregoing and other objects in view, the invention consists in the novel construction and arrangement of elements described, illustrated and claimed, it being understood that modifications may be made within the scope of the claims without departing from the spirit of the invention.

In the drawings forming part of this application:

Figure 1 is a view of the machine in side elevation.

Figure 2 is an elevation from the opposite side.

Figure 3 is an end elevation.

Figure 4 is a longitudinal section.

Figure 5 is a detail in top plan showing means for vibrating a frame or the like mounting a plurality of screens, this means being operated from a crank wheel on the fan shaft.

Figure 6 is a section on the line 6—6 of Figure 4, and through two of the screens within the vibrating frame or screen housing.

Figure 7 is a detail view showing an adjusting device for one of the conveyors.

Figure 8 is a perspective view of an element referred to below.

The main portion of the structure includes bars, such as 10 shown in elevation in Figure 1, the vertical member or members 11 supporting bars 10, the forward and rear axles 12 and 13, and ground wheels, such as 14.

Carried by the main structure is a housing designated 16 within which the rotary cylinder 17 is mounted on a transverse axial element designated 18. This cylinder includes a plurality of teeth 19 adapted to cooperate with the teeth 20 carried by "concaves" 21. Housing 17 is provided with an outward extension 22 at the edge portion of which a door or the like 23 is hinged, the hinge connection being designated 24. A chute or receiving portion is shown at 25, and the bundles of grain or the like are held in such position that they partially enter the housing 16 and the heads come into contact with the rotary cylinder, for the purpose of knocking off all of the seed while the bundles are turned manually, one turn being given to each bundle.

Extending from housing 16 is a conveyor or elevator housing 27, this structure being inclined as shown and accommodating the elevating conveyor 28 comprising chains carrying transverse slats or cleats 29. The chains pass over lower sprocket wheels 30 mounted on axles 31 and these chains also pass over upper sprocket wheels 32 mounted on transverse elements 33.

A main housing 35 is provided with hinged upper closures 36 and 37, and depending downwardly from element 37 is a deflecting device 38, a passageway being provided between the upper end of the elevating conveyor and a board or the like 39. The material passes through opening 40, and thence to the series of screens.

Within housing 35 I mount, or suspend, a housing or frame 42 adapted to mount the screens in the relation shown in Figure 4. The suspending straps or the like are designated 44, and are swung from pivots 45, and vibratory movement is imparted to frame or housing 42 by means of the connections shown especially in Figures 1 and 5. In Figure 5 a side portion of the housing 42 has connected therewith pivoted arm 46, the connection with the housing being a pivotal one, as shown at 47. Arm 46 operates about the pivotal point 48, a bracket 49 having connection with element 50 of the main housing 35.

In order to oscillate the arm or lever 46, I provide a connecting rod 51, pivotally secured to element 46 by means of a link 52. Rod 51 is connected with a crank wheel 53 carried by shaft 54, which constitutes a fan shaft.

The fan structure is shown in Figure 4, and the fan per se is designated 55 and operates in housing 56 at the left of main housing 35, as the structure appears in Figure 4. The fan housing communicates with the interior of the screen frame or housing 42, through opening 57, and the waste material is blown from the several screens designated 60, 61 and 62, by means of air current created by the fan. The material thus disposed of falls through the open lower portion of main housing 35.

The screens within the screen frame or housing 42 (designated 60, 61 and 62) are mounted in a particular relation, the material first falling onto inclined screen 60, this screen partly overlapping screen 61, or extending just over the edge portion thereof, providing a space 61' through which the material falls to screen 62 where it is further operated upon, and from which the waste material is blown by the air current. The lower wall of housing 42 is designated 42', and is inclined so that the material under vibratory movement throughout its passage through the screen frame travels downwardly along the incline 42' and thence to the chute or duct 65 communicating with the conveyor housing 66. Within this housing a discharge conveyor or similar device is mounted, this element being designated 67 and serving to move the material transversely of the machine in order that it may be received and carried upwardly by the loading conveyor 70 illustrated especially in Figure 1 and operating partly within conveyor housing 71.

Suitable driving mechanism for the various moving parts may be provided, and in the present instance I have shown conventionally a motor 75, the shaft of which carries a pulley wheel 76 driving a belt 77 which passes over pulley wheel 78 mounted on shaft 18 carrying the rotating cylinder 17. In Figure 2 this shaft 18 carries on the opposite end a pulley wheel 79 driving a belt 80 passing over pulley wheel 81, the shaft 82 of which imparts movement to pulley wheel 83 driving belt 84 passing over pulley wheel 85 on fan shaft 54. Shaft 82 further carries a sprocket wheel 87 driving chain 88 passing over sprocket wheel 89 for imparting movement to the transverse conveyor or worm 67 operating in housing 66, as shown in Figure 4. It may be added that Figure 7 shows adjusting means 90 for controlling the position of one of the transverse shafts, such as shaft 33 at the upper end of the elevating conveyor 28.

Another detail of construction is shown in Figure 6 wherein the screen frame or housing 42 is shown as carrying angle bars 42$^a$ at opposite sides of the lower portion thereof, these angle bars operating on tracks such as 42$^b$. Figure 8 is a perspective view of the pivoted arm 46 shown in Figure 5 and also shown in Figure 1.

Having thus described the invention, what is claimed as new, is:—

In a thrashing machine, a housing, a fan casing communicating therewith, a fan in the casing, a screen frame, means for suspending the frame, a lower screen within the frame, a middle screen extending over part of the lower screen, an upper screen extending over portions of both of the other screens, and means for vibrating the frame, the main portions of the upper and middle screens extending on opposite sides of a vertical plane passing through their free and overlapping edges, and adjacent edges of these screens constituting discharge edges terminating approximately in said vertical plane, the flow of material over the discharge edge of the middle screen being retarded at that edge by material flowing from the upper screen.

In testimony whereof I affix my signature.

RALPH E. C. YOCKERS.